United States Patent
Vahid (10) Patent No.: US 10,096,003 B2
(45) Date of Patent: Oct. 9, 2018

(54) APPARATUS, METHODS AND SYSTEMS FOR KNOWLEDGE BASED MAINTENANCE

(71) Applicant: Javid Vahid, Dana Point, CA (US)

(72) Inventor: Javid Vahid, Dana Point, CA (US)

( * ) Notice: Subject to any disclaimer, the term of this patent is extended or adjusted under 35 U.S.C. 154(b) by 1451 days.

(21) Appl. No.: 13/907,771

(22) Filed: May 31, 2013

(65) Prior Publication Data

US 2013/0275313 A1 Oct. 17, 2013

(51) Int. Cl.
*G06Q 10/00* (2012.01)

(52) U.S. Cl.
CPC .................. *G06Q 10/20* (2013.01)

(58) Field of Classification Search
CPC .............................. G09B 19/00; G06Q 10/20
USPC ........................................................ 434/365
See application file for complete search history.

(56) References Cited

U.S. PATENT DOCUMENTS

| | | | | |
|---|---|---|---|---|
| 2002/0022969 A1* | 2/2002 | Berg | ...................... | G06Q 10/06 705/305 |
| 2003/0167111 A1* | 9/2003 | Kipersztok | ........ | G05B 23/0278 702/185 |
| 2006/0020485 A1* | 1/2006 | Schierholt | .......... | G06Q 10/0631 705/7.12 |
| 2008/0026743 A1* | 1/2008 | Kaplan | ................... | H04L 67/04 455/425 |
| 2010/0102974 A1* | 4/2010 | Keast | ..................... | F15B 19/005 340/626 |
| 2010/0229080 A1* | 9/2010 | Roulland | ................. | G06N 5/02 715/205 |
| 2010/0241946 A1* | 9/2010 | Ofek | ................. | G06F 17/30247 715/231 |
| 2011/0211760 A1* | 9/2011 | Boncyk | ............. | G06F 17/30259 382/190 |
| 2013/0335611 A1* | 12/2013 | Roman | ............. | G06F 17/30247 348/333.01 |
| 2015/0104767 A1* | 4/2015 | Robineau | ................ | G06T 17/05 434/219 |

\* cited by examiner

*Primary Examiner* — Eddy Saint-Vil
(74) *Attorney, Agent, or Firm* — Cionca IP Law P.C.; Marin Cionca (57) ABSTRACT

A processor based method comprising: identifying a device using a portable electronic apparatus; offering a plurality of options, for selection by a user of the portable electronic apparatus, about how to proceed for the purpose of attending the device; providing step-by-step guiding instructions as to how to attend the device, the guiding instructions being specific to the identified device and the option selected; if, after user follows the guiding instructions, the purpose of attending the device is achieved, ending the process; and, if, after user follows the guiding instructions, the purpose of attending the device is not achieved, providing communication options to the user, using the portable electronic apparatus.

15 Claims, 9 Drawing Sheets

APPARATUS, METHODS AND SYSTEMS FOR KNOWLEDGE BASED MAINTENANCE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to software and hardware as a service, and more particularly to apparatus, systems and methods for providing a uniform technology platform for the easy maintenance, inspection, replacement and repair of various devices, and replacement of any operating and maintenance manuals and of any items which come along with them.

2. Description of the Related Art

Currently, most devices come from the manufacturer with operating and maintenance manuals, often in paper format. When the owner of the device or a repair technician wishes to repair the device, they need to first locate the device manual, which by the time repair is needed, may be lost or misplaced. The problem is compounded to a high degree when the owner or the technician is dealing with a large number of devices that need to be operated, maintained, inspected, replaced, or repaired, such as in a refinery. Looking for the necessary manuals is time consuming, and thus, at enterprise level can become very costly. The problem is especially evident in an emergency situation.

Thus, there is a need for a system and process that provide not only an easy and fail-proof method to device maintenance, where the paper manuals of yesterday have failed, but that also deliver to the world a uniform technology platform whereas, regardless of the device in need of attention, the experience to maintain, repair, inspect and/or replace said device is different only in content, while the architecture of the user experience remains standardized in the interactive delivery of such by the system.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, a device is equipped with an identification tag, which, when the device is in need of repair, can be read by a an electronic device, which then retrieves from a database the appropriate device manual and repair guide to assist a user with the repair of the device. Thus, an advantage is that assistance is provided promptly to the user when the device is in need of repair. Another advantage is that standardization of maintenance procedures may be achieved within large scale operations, such as in a refinery.

In another exemplary embodiment, the device is identified by taking a picture of the device and then processing that picture. Thus, an advantage is that no tags are needed, which can be expensive, and over time, lost or destroyed.

In another exemplary embodiment, a processor is configured to receive alarms or error messages about issues a device has, and then, the processor calls a server to download manual sections and repair guides specific to those issues into an electronic device, which then displays them to assist the user repair the device. Thus, an advantage is that, by the time the user arrives at the location of the device, the user has all the information needed to address the specific issues with the device.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

As used herein and throughout this disclosure, the term "knowledge device" refers to any portable electronic device which may have a processor, a memory, a transceiver, an input, and an output, which is configured to performs the processes described herein, and which may be capable of communicating across a network, such as a mobile network, a satellite network or the internet. Examples of such devices include tablet computers (one page or two-page and foldable), laptop computers, smart phones, cellular phones, personal digital assistants (PDAs), glasses such as Google® Glass™, and so on. The memory stores data, applications, software, or logic.

Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, NFC, Bluetooth®, and Wi-Fi transceivers.

As used herein and throughout this disclosure, the term "knowledge processor" refers to any processor capable of communicating with a processor of the maintained device, with a cloud or networked server(s) and/or with the knowledge device, for the purposes described herein. The knowledge processor may have and internal memory for storing data, applications, software, or logic.

As used herein and throughout this disclosure, the term "knowledge app" refers to applications, software, or logic configured to perform or enable performance of the processes described herein.

As used herein and throughout this disclosure, the term "maintained device" refers to any device, machine, tool, equipment, and so on, which may need inspection, replacement, maintenance, repair, or the like, and which may be used in any settings, facilities or operations, whether large scale (e.g., refineries, military, etc) or small scale (e.g., restaurants, offices, home, etc). Examples of maintained devices include pumps, valves, motors, refrigeration equipment, and so on. The term includes consumer goods, such as consumer electronics (e.g., TVs, computers, printers, etc), house appliances (e.g., refrigerators, dishwashers, etc), and so on.

For the following description, it can be assumed that most correspondingly labeled structures across the figures (e.g., 101 and 201, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1:
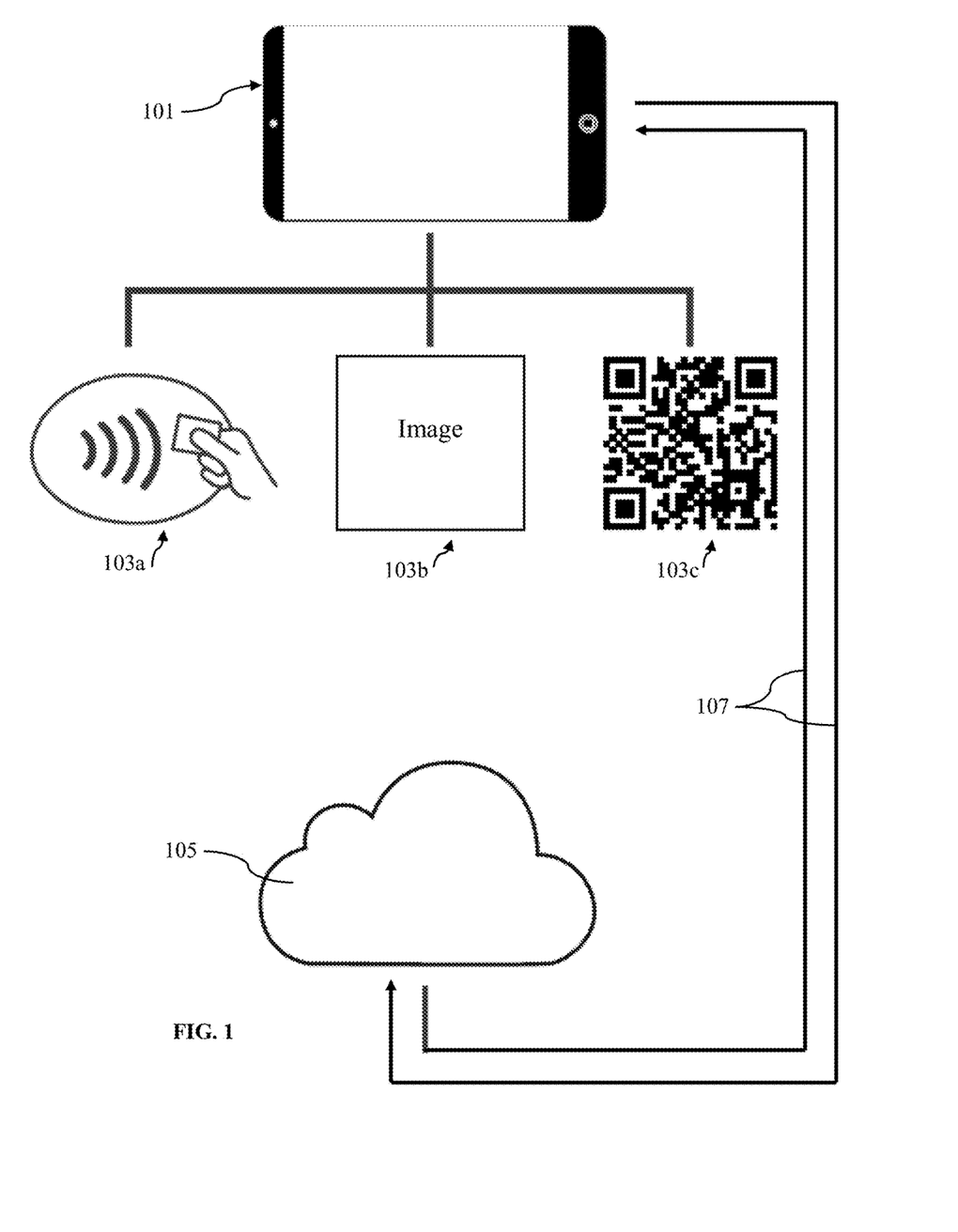
FIG. 1 illustrates a schematic view of a system for knowledge based maintenance and repair, according to several embodiments.

FIG. 1 illustrates a schematic view of a system for knowledge based maintenance and repair, according to several embodiments. As shown, the system includes a knowledge device 101 capable of two-way communication 107 over a network (e.g., the internet) with a one or more servers or the cloud 105. The knowledge device 101 may have a knowledge app preinstalled in it and ready to be launched by the user (e.g., a maintenance worker) when needed.

The knowledge device 101 is enabled to identify the maintained device which needs repair or maintenance (not shown in FIG. 1; 220 in FIG. 2), at least in one way, using one or more of various known technologies. For example, the maintained device may have a near field communication (NFC) tag 103a attached to it, which the knowledge device 101 may be enabled to read, and thus, identify the maintained device. To do so, the user would simply bring the knowledge device within the NFC's radius of communication (e.g., 5 centimeters). Once the maintained device is identified by the knowledge device 101, a request may be sent to the server/cloud 105 to provide for download the operation and maintenance manual for the identified maintained device and/or custom text, video, and/or animation guide on how to repair the device, as it will be described in more details herein when referring to FIG. 3.

Thus, at any time (e.g., during a device failure emergency) a user may have quick and convenient access to operation and maintenance manual and/or to custom text, video, and/or animation guide on how to repair the device, which are all specific to the identified device that needs repair and/or maintenance.

As shown in FIG. 1, other methods for identifying the maintained device may be used alternatively or concomitantly. As an example, a quick response code (QR) tag or label 103c may be attached to the maintained device and the knowledge device 101 may be equipped with a QR reader and configured to read the QR code and extract from it the identity (e.g., serial number) of the maintained device.

As another example, an image recognition engine 103b (e.g., Glyphr™) may be integrated in, or associated with the knowledge app and used as follows: the user will take a picture of the maintained device using the camera of the knowledge device 101, or, preferably, the user will only need to bring the maintained device in front the knowledge device's camera; although no actual picture will typically be stored, the backend service will typically take picture after picture and send them via, for example, data calls to the server/database to find the most closely related image, providing for a "recognized" device; thus, technologically, using this preferred alternative, the software/system will be taking pictures, but from the user's perspective, no picture will be taken. Next, the image recognition engine, which may run on the web server(s) 105 or on the knowledge device 101, would process the picture(s), identify the shape of the maintained device from the image/picture, and then, for example, by running the shape against a database, the knowledge app would identify the maintained device.

Using an image recognition technology to identify the maintained device has the advantage that nothing (e.g., no NFC tag or label) has to be installed and maintained on the device. As other examples, technologies such as Bluetooth® or Wi-Fi may also be used to identify the maintained device. Again, once the maintained device is identified, the knowledge app may be configured to call the web server(s) or the cloud 105, instruct it to interrogates the database for a device match, and to then send appropriate device data (e.g., operation and maintenance manual, custom text, video and/ or animation guide on how to repair the device, historical device data, necessary safety protocol, etc) to the knowledge device 101, for immediate use by the user.

Figure 2:
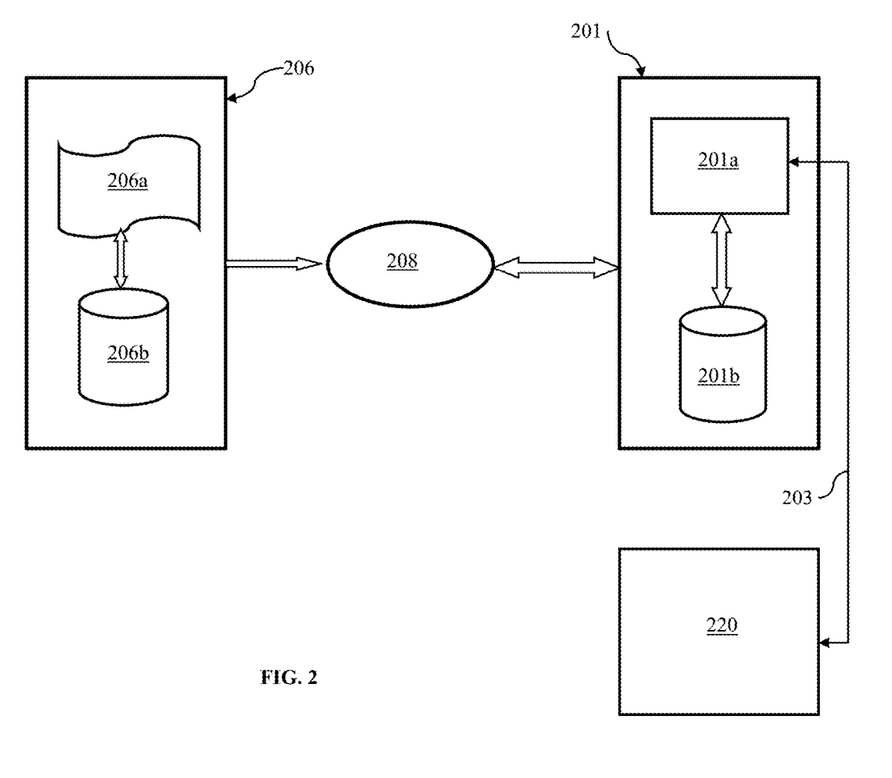
FIG. 2 illustrates another schematic view of the system from FIG. 1, according to an embodiment.

FIG. 2 illustrates another schematic view of the system from FIG. 1, according to an embodiment. As shown, the system may include a web application 206, which may include a database 206b (e.g., MySQL) and an admin interactivity component 206a. The web application 206 may be built using for example the Ruby on Rails framework and may be configured to accept queries from the knowledge device 201 and to retrieve from the database 206b, and then package and deliver the requested data about the identified device 220 (e.g., a pump).

Again, such device data may include operation and maintenance manual, custom text, video and/or animation guide on how to repair the device, historical device data, necessary safety protocol, and so on. The historical device data may include data that has been recorded by the system since the device has been connected to the system (e.g., how many times the maintained device has been repaired in the last 60 days, the name(s) of the technician(s) who worked on this device and the respective dates, the temperature and humidity the last time the device was down, previous causes the device was down for and respective dates, etc.

The database 206b may store data about a multitude of devices (e.g., all devices used in a refinery). The identification of the maintained device 220 by the knowledge device 201 may be achieved using the communication path 203, as described above when referring to FIG. 1 (i.e., using NFC, QR, image processing, etc.).

The web application 206 runs on web server(s) or in the cloud (105 in FIG. 1) and communicates via web services 208 with the knowledge device 201. The knowledge device 201 (e.g., a tablet computer) may include the native tablet application 201a (e.g., the Android® native tablet application, or a proprietary application implementing the processes described herein), an integrated database 201b (such as SQLite) and the modules (e.g., a QR reader) needed to identify the maintained device as explained earlier.

In an exemplary alternative embodiment, in the systems depicted in FIGS. 1-2, the device data may be stored in the memory of the knowledge device instead of the cloud or it may be stored on both, the cloud and the memory of the knowledge device, as a backup solution, in case of cloud connection failure when a maintained device has an issue and prompt intervention is required.

Figure 3:
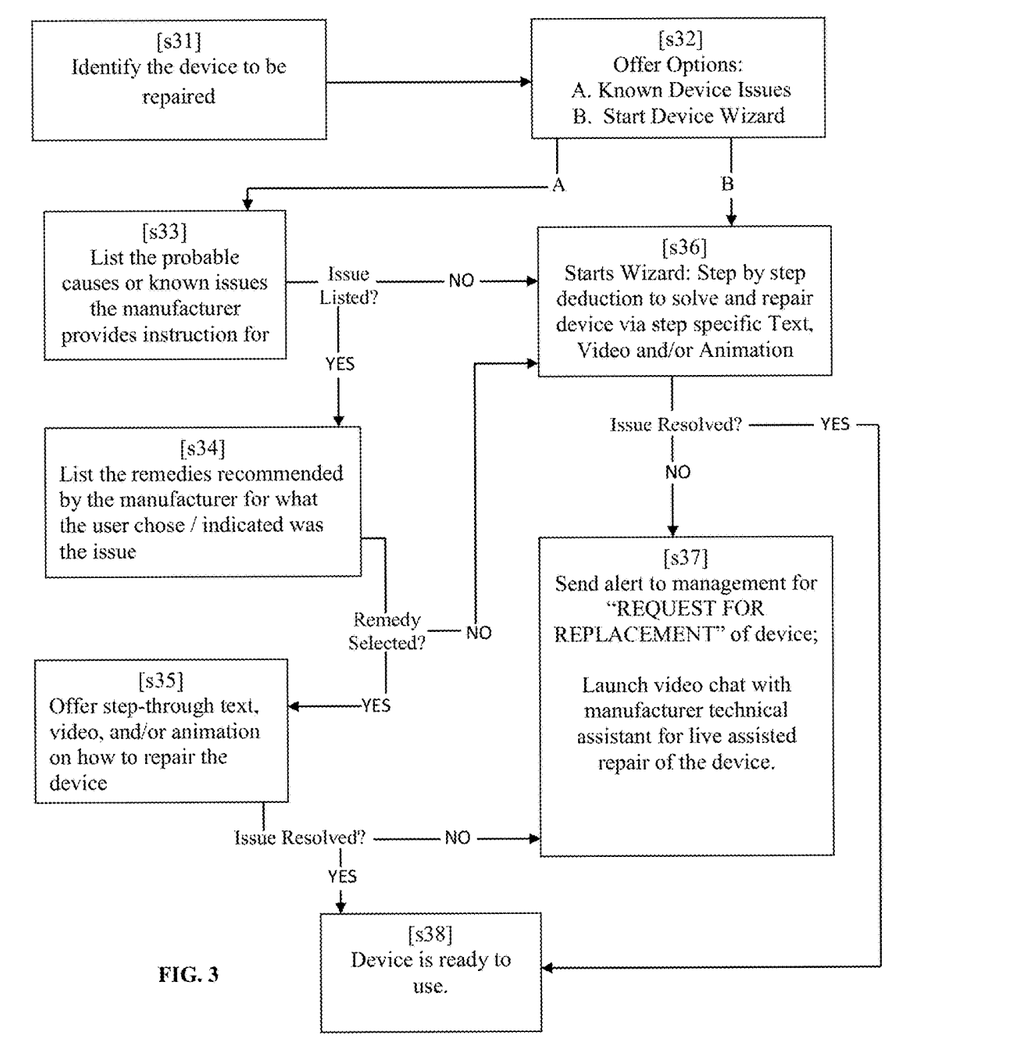
FIG. 3 is a flow chart depicting steps of a process for knowledge based maintenance and repair, according to several embodiments.

FIG. 3 is a flow chart depicting steps of a process for knowledge based maintenance and repair, according to several embodiments. First (step s31), a user uses the knowledge device (101, FIG. 1; 201 in FIG. 2)) to identify/recognize the device to be operated, maintained or repaired (220, FIG. 2). The identification may be performed as described earlier when referring to FIG. 1 (i.e., using NFC, QR, image recognition engine or other similar technologies).

Once the device is identified, in an embodiment, the process may continue with a query sent to the web application for appropriate device data (e.g., operation and maintenance manual), and the process may end with the device data being received by the knowledge device for the user to use, as described earlier when referring to FIGS. 1-2.

In another embodiment, the user may be provided, typically on the display of the knowledge device (but audio output may be used as well), with two path options (step s32) depending on whether or not the user (e.g., a technician) believes that she knows what the issues with the device are (e.g., what part needs to be replaced). If the user indicates that she knows what the issues are, she may be provided with a list (step s33) of known or probable issues or causes, for example, as provided by the manufacturer of the device, and for which the manufacturer provides instructions on how to resolve.

Next, if the issue is listed, and typically after the user selects it, in step s34 the remedy or remedies recommended by the manufacturer for the selected issue are shown on the display of the knowledge device. If the user selects one of the remedy provided (e.g., it has the necessary replacement part(s) required by this remedy), next, in step s35, on the display of the knowledge device, the user is provided with the option to choose a guide on how to repair the device, in text, video, audio and/or animation format. If the reading, watching, or listening to the guide enabled the user to resolve the issue the device had (e.g., replace the broken part), the device is returned to its normal operational status (step s38).

At any time, the user may choose (in step s32) or revert back (e.g., in steps s33-34) to the option of starting a device specific wizard, which provides step-by-step deduction on how to maintain, operate or repair the device (step s36). The wizard may also be provided in text, video, audio and/or animation format, or a combination thereof, to suit for example the learning preferences of the user. If the wizard enabled the user to fix the device, again, the process ends in step s38, with the device being operational.

As shown in FIG. 3, if neither using the first path (i.e., when the user believed that she knows the issue), nor using the second path (i.e., when choosing the wizard) the issues with the device are not resolved, the user may be provided in step s37 with the option of launching from her knowledge device, directly from the knowledge app (e.g., by touching a button on the display), for example, a video chat with the manufacturer's technical assistant, for live assisted repair of the device.

Alternatively or concomitantly, also as an example, the user may be provided with the option of sending directly from her knowledge device and its app an alert to the management (step s37) with, for example, a request for replacement of the defective device, which cannot be repaired. Thus, the knowledge device and the supporting systems and processes described above provide a fully integrated, customized and efficient way of addressing operational, maintenance and repair issues regarding any device (i.e., maintained device). This is particularly beneficial when the user (e.g., a maintenance technician) has in her care a large number of devices, such as is the case in a refinery.

Figure 4A:
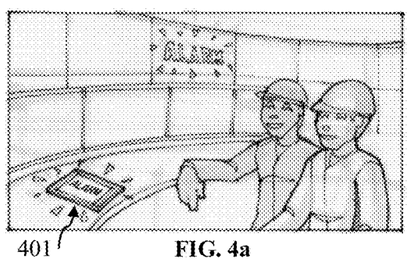
FIGS. 4a-d represent a story board of an exemplary circumstance of when and how the knowledge device is used.

FIGS. 4a-d represent a story board of an exemplary circumstance of when and how the knowledge device is used. In this scenario, one of the monitored devices of a plant or factory has an issue and an alarm goes off in the control room (FIG. 4a). As shown in FIG. 4a, the knowledge device 401 may also receive the alarm through a communication process such as the one described below when referring for example to FIG. 5.

Figure 4B:
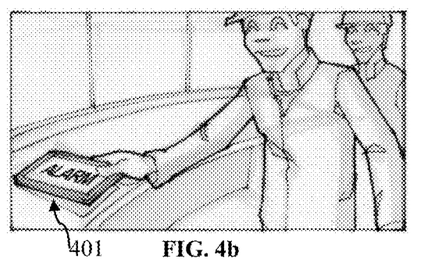
Figure 4C:
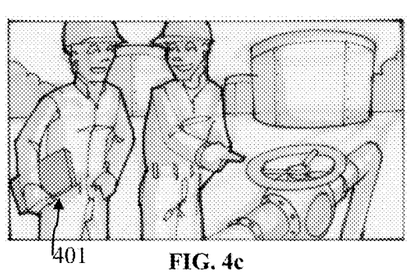
Figure 4D:
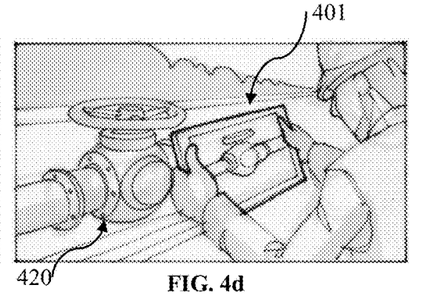

Next, in FIG. 4b, a technician grabs the knowledge device 401 and walks (FIG. 4c) to the location of the maintained device that caused the alarm to go off. If, for example, there are no other means to identify the faulty device 420 (FIG. 4d), such as NFC tag, the technician takes a picture of the device 420 with the camera of the knowledge device 401, and then the knowledge device 401 processes the picture and identifies the device 420 as described earlier when referring to FIGS. 1-2.

Next (not shown), once the device 420 is identified, the knowledge device places a call to the cloud for the appropriate device data (manual, repair guide, etc), as also described earlier when referring to FIGS. 1-2, and the technician, with the device data available on her knowledge device 401, starts repairing the faulty device 420. Other ways to retrieve the device data are contemplated herein, such as the ones described below when referring to FIGS. 5-7. For example, by the time the technician arrives at the location of the faulty device 420, the device data specific to the issue the device 420 has may already be downloaded onto the knowledge device 401, after a call to the cloud/server(s) was placed by a knowledge processor as described below when referring to FIGS. 5-6.

Figure 4E:
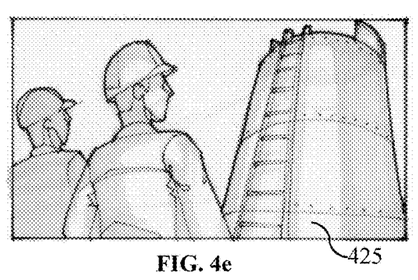
FIGS. 4e-h represent a story board of another exemplary circumstance of when and how the knowledge device is used.
Figure 4F:
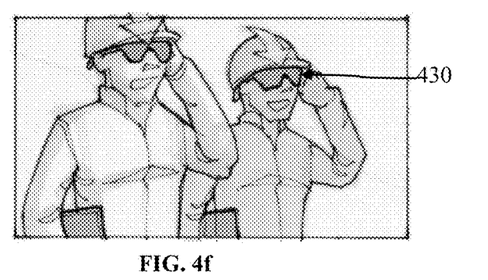
Figure 4G:
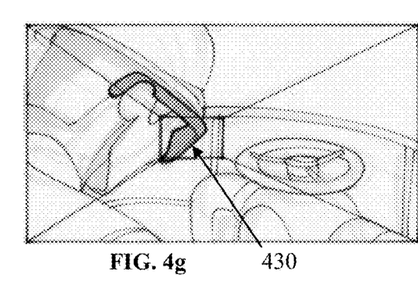
Figure 4H:
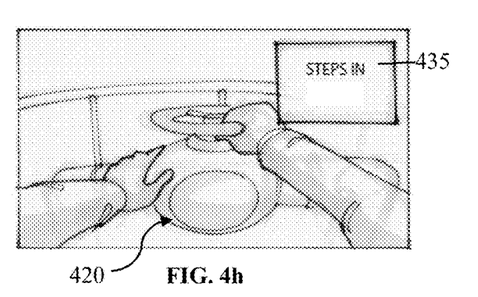

FIGS. 4e-h represent a story board of another exemplary circumstance of when and how the knowledge device is used. In certain situations, the faulty device 420 may be in a location which is difficult to access, such as the top of a tour 425 (FIG. 4e). Then, a more suitable version of the knowledge device may be used, such as glasses 430 (e.g., Google® Glass™) which may be configured to have the same necessary network connectivity, communication, processing, memory, input and output capabilities as described herein when referring to the knowledge device. For example, a small display may be placed in one of the corners of technician's field of vision, so that she can simultaneously see the faulty device 420 (see FIG. 4h) and the small display 435 with the device data (e.g., repair guide), while having both of her hands free to repair the device 420.

Figure 5:
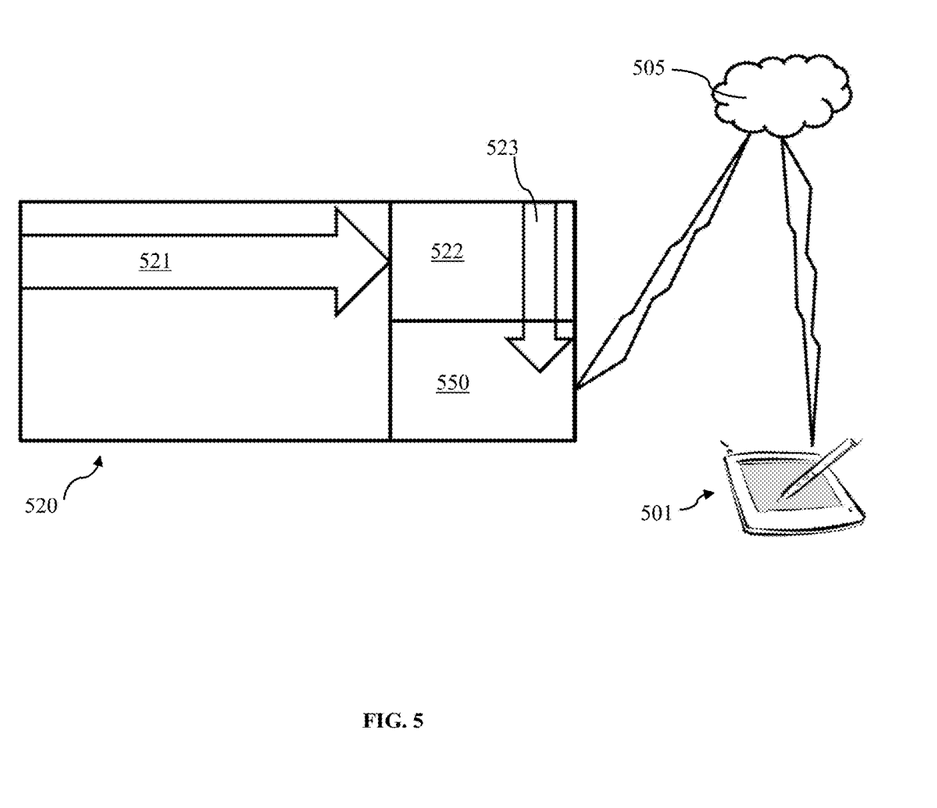
FIG. 5 is a schematic view of a system for knowledge based maintenance and repair, which include a knowledge processor residing inside the maintained device, according to another embodiment.

FIG. 5 is a schematic view of a system for knowledge based maintenance and repair, which include a knowledge processor residing inside the maintained device, according to another embodiment. Installing the knowledge processor inside the maintained device may be a good option when the knowledge processor is ready for integration during the manufacturing of the maintained device. Certain maintained devices 520 may have one or more sensors 521 (e.g., temperature sensor) reporting to a maintained device processor 522, which may trigger an alarm 523 when the value of a monitored parameter (e.g., temperature of the maintained device) falls outside a normal value range.

As shown in this example, the maintained device processor 522 resides inside the maintained device 520. A knowledge processor 550 may also reside inside of the maintained device 520, and the knowledge processor 550 may be set to communicate with the maintained device processor 522, such as to receive the alarms or the error messages from the maintained device processor 522. Upon receipt of alarms or error messages, the knowledge processor 550 may be configured to call the cloud or networked server(s) 505 to download the data pertaining to the respective alarm or error message (e.g., specific section of operation and maintenance manual, guide of how to fix the specific issue that generated the alarm or error message, etc) to the knowledge device 501.

The knowledge processor 550 may also be configured to send information to the knowledge device 501 about the alarm 523, about the first step to be taken, about the maintained device 520, and so on, and also about the location of the maintained device 520 in a plant or factory for example, using, for example, GPS technology. This way, a technician for example who was attending to another problem somewhere else in the plant, would receive on her knowledge device all the information she needs about where to go, what device needs her immediate attention, what the issue is, and the specific guide on how to resolve the issue. It should be apparent that such a system and process is reliable, efficient and cost effective.

Figure 6:
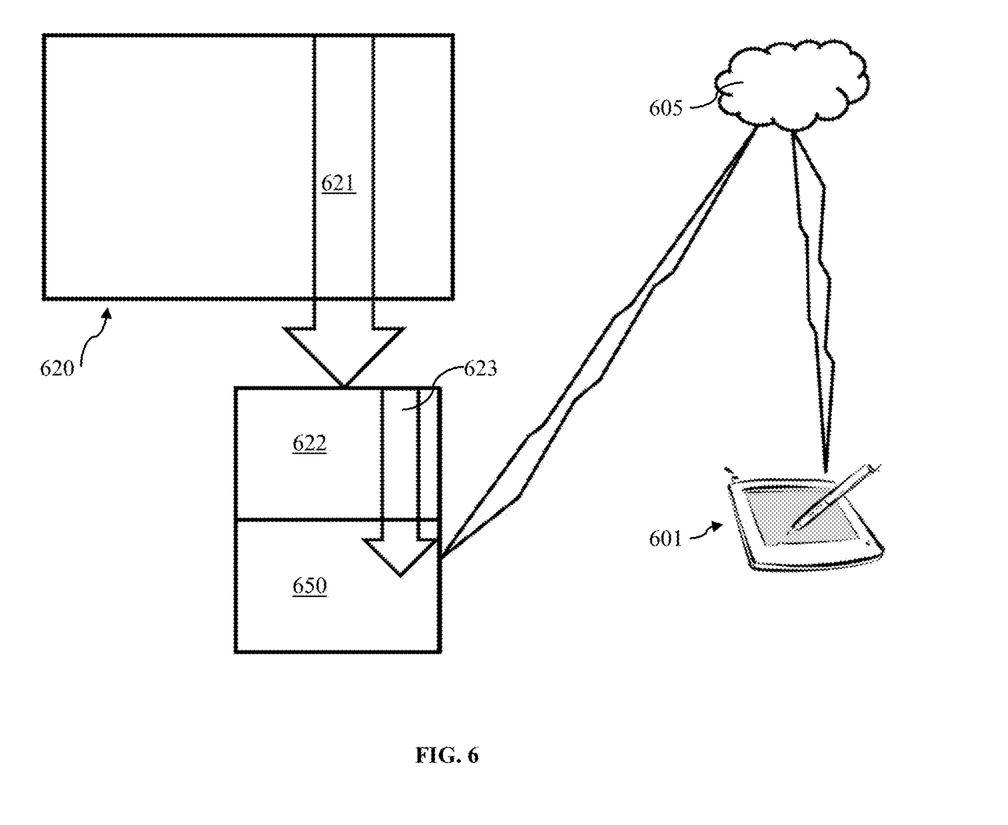
FIG. 6 is a schematic view of a system for knowledge based maintenance and repair, which include a knowledge processor residing outside the maintained device, according to another embodiment.

FIG. 6 is a schematic view of a system for knowledge based maintenance and repair, which include a knowledge processor residing outside the maintained device, according to another embodiment. Installing the knowledge processor outside the maintained device may be a good option when the knowledge processor is not ready for integration during the manufacturing of the maintained device, and thus, has to be integrated at a later time. This system is similar in terms of structure and function with the system described above when referring to FIG. 5, except that the knowledge processor 650 resides outside the maintained device 620.

As shown, the maintained device processor 622 may also reside outside the maintained device 620. "Outside the maintained device 620" may mean being attached to the exterior surface of the maintained device, being in the maintained device's proximity (e.g., 5-10 centimeters away) or being far away from the maintained device, such as when the processor(s) are in the control room of a plant and the maintained device is somewhere in the plant. In either case, it is important that all the communications described above when referring to FIG. 5 be enabled (between the sensors 621 and maintained device processor 622, between maintained device processor 622 and knowledge processor 650 (sending alarm 623), between knowledge processor 650 and the cloud 605 and between the cloud 605 and knowledge device 601).

Figure 7:
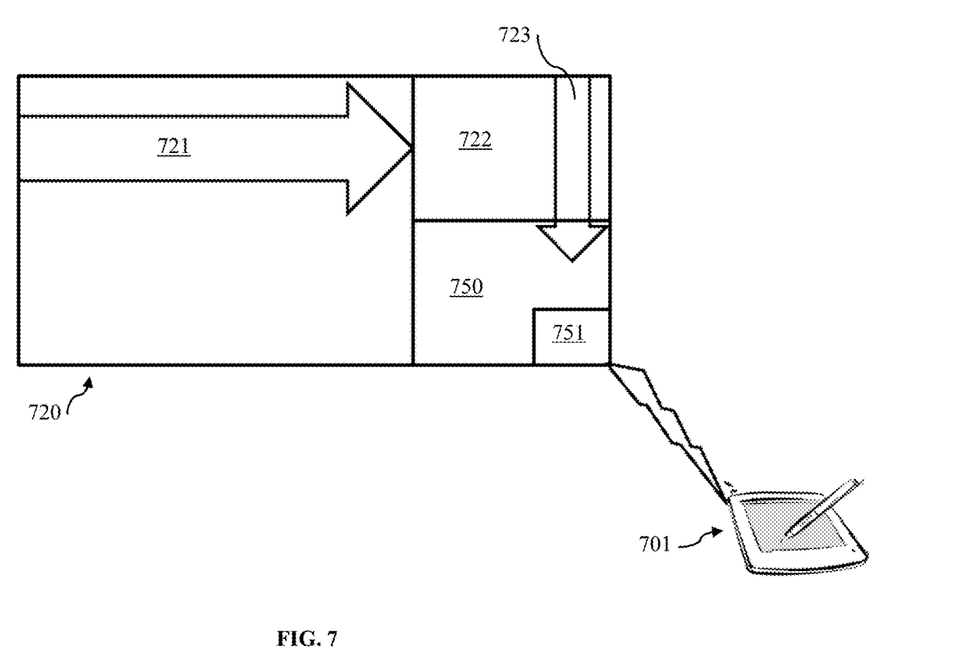
FIG. 7 is a schematic view of a system for knowledge based maintenance and repair, which include a knowledge processor and memory residing inside the maintained device, according to another embodiment.

FIG. 7 is a schematic view of a system for knowledge based maintenance and repair, which include a knowledge processor and a memory residing inside the maintained device, according to another embodiment. In this system, as described above when referring to FIG. 5, the sensors 721 of the maintained device 720 communicate with the maintained device processor 722, which then may send an alarm 723 or error message to the knowledge processor 750.

As shown, in this system, the knowledge processor 750 may have an internal memory 751, which may store at least some of the data (e.g., operation and maintenance manual for the respective device 720), which is normally stored on the cloud 505 in the system depicted in FIG. 5. Thus, the knowledge device 701, through a wireless (e.g., Bluetooth®) or wired (e.g., USB) may receive the data (e.g., exact/specific section of the manual that is needed to resolve the issue reported by the maintained device processor 722), directly from the knowledge processor's internal memory 751. This may be a benefit when network connection to a cloud or server(s) is not available.

Aspects of the systems described above when referring to FIGS. 5-7 and/or other arrangements may be combined to obtain other systems. For example, the knowledge processor 750 and its internal memory 751 may reside outside the maintained device 720. As another example, all or some of the data needed by the user to resolve the issues (e.g., manual, text, animated or video guide on how to repair, etc.) may reside on the memory of the knowledge device 701.

As another example, the same data may simultaneously reside on and be accessible from the cloud (605 in FIG. 6) and the internal processor memory 751 and/or the memory of the knowledge device 701. This may be advantageous in situations when the connection to the cloud or server(s) is temporarily unavailable. Then, the alternative residences of the data (i.e., internal memory 751 and the memory of the knowledge device 701), which are local, may provide a backup solution in case of cloud/server connection failure. This may be very important in an emergency situation.

Figure 8:
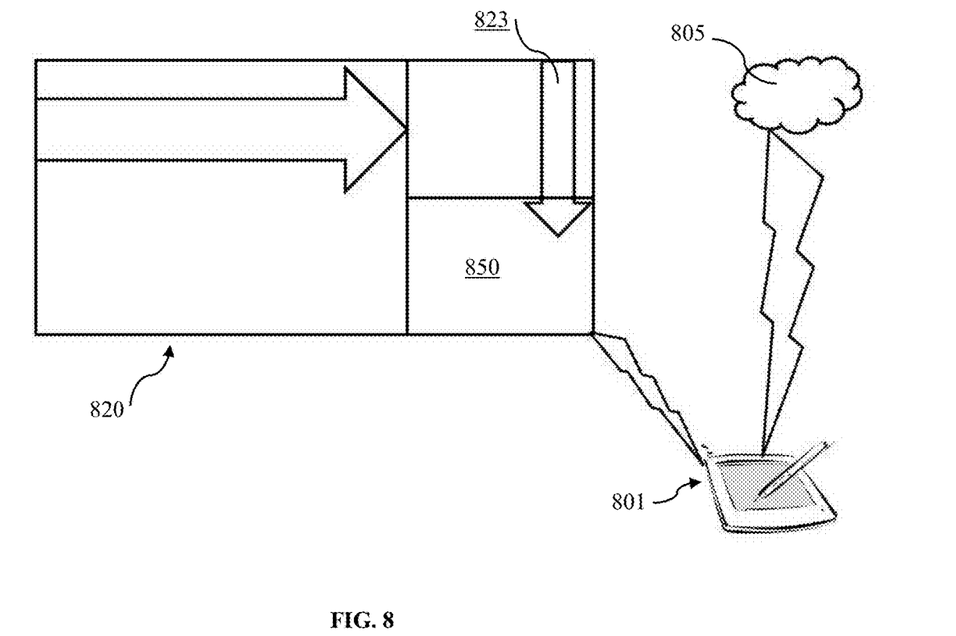
FIG. 8 is a schematic view of a system for knowledge based maintenance and repair, in which the knowledge processor communicates with the knowledge device, according to another embodiment.

As another example, as shown in FIG. 8, the knowledge processor 850, which may be inside (as shown) or outside of the maintained device 820, may communicate, via, for example, a Bluetooth® or a Wi-Fi link, to the knowledge device 801 the identity of the maintained device 820, the nature of the alarm 823 and/or other data, and then, the knowledge device 801 may call the cloud 805 for the necessary device data (specific section of manual, specific repair guide, etc).

The apparatus, systems and processes described in this disclosure provide first a unique "device awareness" solution by allowing the user to quickly identify the device that needs repair or maintenance. This is achieved, for example, by combining the power of image recognition with 3-dimensional rendering of image, delivered in a fully interactive display which may be interfaced with via web, tablet, or glasses/contact lens. When the need for device input is not met by the capabilities of the image recognition engine, the user interface (UI) of the knowledge device may account by offering the user what was recognized and/or a list of possible devices; here the user may easily and swiftly indicate the correct device.

Once the recognition of the device is being attended to, the knowledge device displays two potential paths for the user: Knows the Problem, or Needs the Wizard. Regardless of the path of choice, each step entered by the users, offers a trio of interactive media to assist the users in their task: they may leverage 1.) Animation; the animation may offer the user the ability to virtually play with the device, move its parts, and activate the removal/replacement of an individual part/component in a view that is free of the obstruction of a humans hands as would be present in live action video of the same removal/replacement of an individual part/component; 2.) Video; the video offers the user the ability to see a particular removal/replacement of the entire device or individual part/component while taking into account proper posture, position, and timing of a live action example of said step/process; 3.) Text; to seasoned pros, who perhaps need but a quick reminder, or to the mind who expands most readily in written word, the text is also always an available component of bringing our users to a healthy device.

All three of these options, animation, video, and text play not only symbiotically well in the seamless delivery through UI toggling, but allow also for the unlimited loitering on and in between the three options until the user has indicated they are ready to move on.

The system also provides for a uniqueness of serving as a portal through which live video-based chat is enabled as the user arrives to the last step of their task in an unsuccessful state. At this point, the knowledge device becomes a communications device as a call is launched to a manufacturer approved technical assistant, for a final attempt at resolve with live, visual, expertly trained help.

Figure 9:
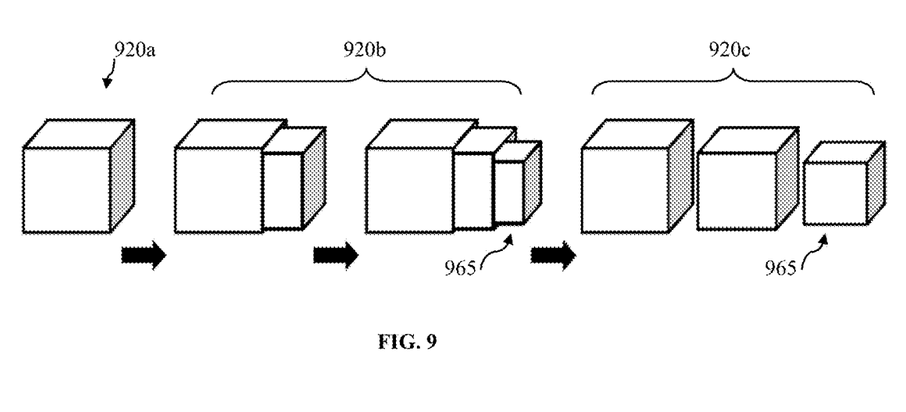
FIG. 9 is a schematic view of a process for expanded or exploded virtual viewing of a maintained device, according to another embodiment.

The apparatus, systems and processes described in this disclosure may also include an expand/explode feature, which may be configured to allow the user, as shown in FIG. 9, to virtually open, expand and/or explode the maintained device, from closed view 920*a* (as the device is in real life) to the expanded view 920*b* (e.g., parts move away from each other but do not completely separate), or to the exploded view 920*c*, in which parts are completely separated. With this feature, when, for example, a user moves out with two fingers on the display of the knowledge device, the knowledge app may be configured to virtually open up the maintained device and, for example, slowly go from closed view 920*a*, to expanded view 920*b* and/or exploded view 920*c*. As shown in FIG. 9, all views may be three-dimensional (3D).

The expand/explode feature may be configured to provide virtual interactive 3D graphic and/or holographic rendering of the maintained devices and their respective parts and pieces through a process which may be termed as "virtual device parts explosion" (VDPE). When the user accesses the VDPE process, she may, for example, by either a zoom or single button/touch command, execute a controlled device deconstruction (e.g., expansion, explosion), whereas, the user controls how deep and/or complete the VDPE of a device is. Thus, for example, referring to FIG. 9, the user could control the deconstruction to culminate with an expanded view (920*b*) or an exploded view 920*c*. It should be apparent that FIG. 9 is a very simplified depiction of what the VDPE process may be configured to do. For example, the VDPE process may be configured to offer various degrees of virtual expansion or explosion of the maintained device and its parts, and/or panning capabilities.

Likewise, at any time, an interior part (e.g., 965 in FIG. 9) of the virtually expanded or exploded device, which has been partially or completely exposed by how far the current VDPE has been taken, may be selected/indicated and then that interior part itself, which may have its own elements, may be controllably virtually expanded, exploded, panned, etc. For example, let's assume that the maintained device is a car. The user may, for example, access the virtual car through the knowledge app's user interface and may begin the act/operation of VDPE. As the user progresses, the motor for example is exposed. Next, the user indicates or selects the motor with, for example, a single touch/selection, and launches the VDPE as to the motor, in order to reveal its internal parts (e.g., pistons, oil pump, etc) that may need repair, inspection, replacement or maintenance. Thus, when the maintained device is complex, there may be multiple layers of the maintained device, which may require deep exploration using the VDPE and its various attributes, as described herein.

The VDEP behavior may be based on real world physics. This means that, for instance, if a maintained device contains two springs, one high tension, one low tension, then, for example, the higher tension spring may require the user to strike/press the screen a bit harder in order to virtually compress the sprig. In another instance, if the maintained device has a lever which has a "stop/block" on one side, so that this lever may only turn one direction, or even only turn so far in either direction, then these real world constraints are applied to the virtual device such that it behaves the same when the user interacts with it on the screen of a knowledge device.

To take things even further, another example of real-world physics, which may be employed in the VDPE process, is in position dynamics, whereas, for example, if a part cannot come off until a parent/support part is first removed, then the user will need the same expansion/explosion order to be shown on the display of the knowledge device.

The VDPE process may also incorporate the physics of real world material viscosity, density, texture, flexibility and/or other material properties, to the virtual rendering of the maintained device. For example, where a part of the maintained device is made from rubber, the VDPE process may be configured to allow the virtual rendering of the respective part to be associated with an inference that the part is mildly flexible. As another example, in order to mimic the real world, a high density, virtually rendered fluid may be configured to react slower than a low density fluid, when under the VDPE functions.

Figure 10:
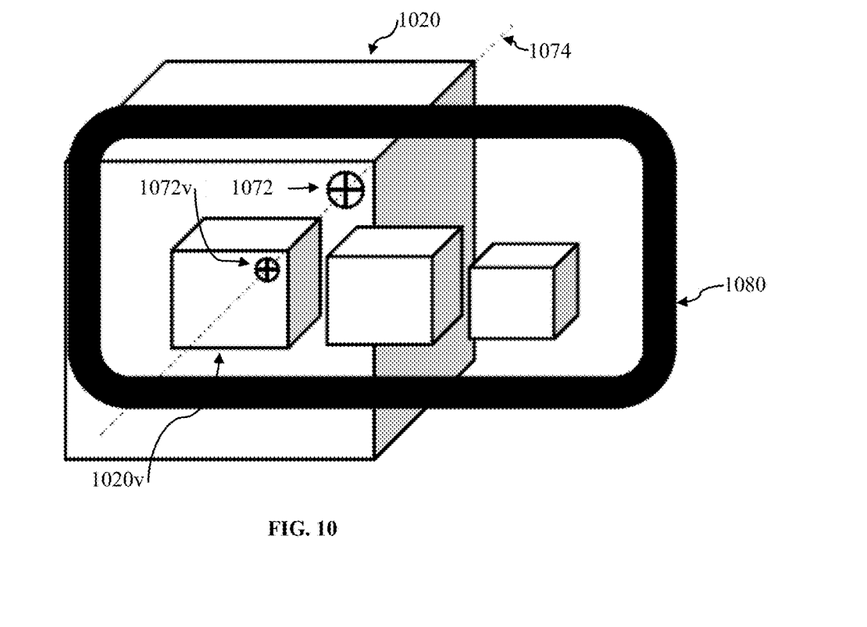
FIG. 10 is a schematic view of a process for matching a maintained device with its virtual rendering, according to another embodiment.

Lastly, the VDPE process may also include a matching function, which a user may use, and which may work as follows: the image recognition engine described earlier is communicating/interfacing in real-time with the VDPE so that the 3D rendering of the device is precisely married/overlaid upon the real-world device or its image. For example, as shown in FIG. 10, let's assume that the user has to inspect/repair a device 1020 (e.g., a pump), which may have several screws that may need removal, such as the one shown (1072). If a pair of glasses with display capabilities (e.g., Google Glass™) are used by the user, when he looks with her real human eyes/vision through the lens 1080 at the device 1020, she has in between her vision and the device 1020, the display portion of the lens, which has the 3D rendered device 1020v mapped virtually ("augmented") onto the real-world device 1020, she is viewing with her human eyes/vision. Thus, if, for example, the instruction from the repair guide is to remove the primary screw, which is the top right screw 1072, then the corresponding virtual/VDPE screw 1072v, may be placed directly upon, or aligned with (such that they have a common axis 1074), the real-world screw 1072. In addition, the knowledge app may be configured to make the virtual screw 1072v glow, flash, or provide other visual signal(s), thus indicating and/or confirming that that is the correct screw to be removed. This configuration may be achieved, for example, through real time interfacing between the image recognition engine described earlier and the VDPE.

In addition, if the lens 1080 has display capabilities anywhere on/in the lens, then the knowledge app may also be configured to detect the apparent position of real screw 1072 in the lens 1080, and make that spot in the lens flash, glow, etc. The apparent position of real screw 1072 in the lens 1080, is the spot in the lens 1080 through which the user sees the real screw 1072 with her eye. As an alternative, both spots, the one depicting the virtual screw 1072v and the one designating the apparent position of real screw 1072, may flash, glow or provide other type of visual signal(s).

Furthermore, if the knowledge device used is, for example, a tablet computer, and not glasses with display capabilities as described above, in which case the rectangle 1080 in FIG. 10 depicts a display of that tablet, then the image captured by the tablet's camera of the real device 1020, including its real screw 1072 will appear on the display. In addition, the virtual device 1020v, including the corresponding virtual screw 1072v, will also appear on the display, as described earlier, due to the interplay between the image recognition engine and VDPE. Once again, the virtual screw 1072v may be aligned with, placed over, or the like, the image of the real screw 1072, and one or both locations on the display may provide a visual signal to indicate/confirm the right screw that needs to be removed.

As described earlier, the virtual device 1020v may be expanded, exploded, panned and so on. In addition, in and out zooming capability of the device is preferably also provided.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the described methods. Acts, elements and features discussed only in connection with one embodiment are not intended to be excluded from a similar role in other embodiments.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A processor based emergency repair method comprising:
measuring a parameter value of a monitored device via a sensor mounted in the monitored device;
communicating the parameter value by the sensor to a device processor installed in the monitored device;
communicating by the device processor to a knowledge processor also installed in the monitored device, when the parameter value falls outside a normal value range, the knowledge processor having an internal memory which stores backup guiding instructions for the monitored device and sends the backup guiding instructions locally to a portable electronic apparatus in an emergency when connection to a server is temporarily unavailable;

generating by the knowledge processor and sending to the server via a first transceiver installed in the monitored device, a device failure alarm when the parameter falls outside the normal value range;

receiving the device failure alarm from the server on the portable electronic apparatus comprising a processor, a memory, a second transceiver, an input including a camera, an output including a display, the device failure alarm indicating an emergency of a need to attend the monitored device which is about to fail or has failed, due to the parameter falling outside the normal value range and being received via the second transceiver;

receiving on the portable electronic apparatus a GPS location of the monitored device which is about to fail or has failed;

transporting the portable electronic apparatus at the GPS location of the monitored device which is about to fail or has failed;

while at the GPS location of the monitored device which is about to fail or has failed, identifying the monitored device which is about to fail or has failed, using the portable electronic apparatus;

providing on the portable electronic apparatus a plurality of options, for selection by a user of the portable electronic apparatus, about how to proceed for the purpose of attending the monitored device which is about to fail to avoid failure of the monitored device or to restore the monitored device if it already failed;

while at the GPS location of the monitored device which is about to fail or has failed, providing step-by-step guiding instructions as to how to attend the monitored device which is about to fail or has failed, said guiding instructions being specific to the identified monitored device which is about to fail or has failed, and the option selected;

if, after the user follows the guiding instructions, the purpose of attending the monitored device which is about to fail or has failed, is achieved, ending the attending; and, if, after the user follows the guiding instructions, the purpose of attending the monitored device which is about to fail or has failed, is not achieved, providing communication options to the user, using the portable electronic apparatus.

2. The method of claim 1, further comprising real-time matching of the monitored device, or of an image of the monitored device captured in real-time with the camera, with a 3D rendering of the monitored device on the display, wherein the matching is accomplished by aligning at least one component of the monitored device with a corresponding 3D rendering of the at least one component, and generating a visual signal viewable by a user on the display and indicating the position of the corresponding 3D rendering of the at least one component in the 3D rendering of the monitored device, wherein the visual signal is accompanied by an instruction to the user to perform an act on the at least one component of the monitored device.

3. The method of claim 1, further comprising displaying on a display of the portable electronic apparatus a 3D rendering of the identified monitored device and mimicking the behavior on the display of the portable electronic apparatus of a 3D rendering of the at least one component of the identified monitored device, based on the physical properties of the at least one component of the identified monitored device, when a user interacts on the display with the 3D rendering of the at least one component of the identified monitored device.

4. The method of claim 3, further comprising changing the appearance of the 3D rendering of the identified monitored device to expanded, exploded, zoom or pan view, according to user's input on the display of the portable electronic apparatus.

5. The method of claim 4, further comprising providing said guiding instructions in real-time and in coordination with the respective view of the monitored device.

6. The method of claim 1, wherein, the portable electronic apparatus comprises a database for storing data associated with a plurality of monitored devices, said data comprising guiding instructions and 3D rendering for each monitored device.

7. The method of claim 1, wherein, the portable electronic apparatus is a tablet computer.

8. The method of claim 1, wherein, identifying the device using the portable electronic apparatus comprises the portable electronic apparatus reading a tag associated with the monitored device.

9. The method of claim 8, wherein the tag is a member of a group consisting of QR tag, NFC tag and RFID tag.

10. The method of claim 1, wherein identifying the monitored device using the portable electronic apparatus comprises positioning a digital camera of the portable electronic apparatus such that the monitored device is in the digital camera's field of view, providing at least one image of the monitored device captured in real-time by the digital camera to an image recognition engine for processing, and determining what the monitored device is based on the at least one image of the monitored device.

11. The method of claim 1, wherein the plurality of options comprises a first option for use when the issues the monitored device has are known, the first option comprising a manufacturer's list of probable issues and recommended remedies, and a second option, for use when the issues the monitored device has are unknown, the second option being a wizard configured to assist the user diagnose the monitored device.

12. The method of claim 1, wherein, attending the monitored device comprises an act which is a member of a group consisting of inspecting, repairing, maintaining and replacing the monitored device.

13. The method of claim 1, wherein, the guiding instructions are in a format which is a member of a group consisting of text, video, sound, animation and 3D rendering.

14. The method of claim 1, wherein, providing communication options to the user using the portable electronic apparatus, comprises sending an alert to the management with a request for replacement of the monitored device and launching a video chat with the manufacturer's technical assistant for live assisted repair of the monitored device.

15. A system for emergency repair of a monitored device, the system including a sensor having a data connection with a device processor, a knowledge processor having a data connection with the device processor and having an internal memory which stores backup guiding instructions for the monitored device and sends the backup guiding instructions locally to a portable electronic apparatus in an emergency when connection to a server is temporarily unavailable, the sensor, the device processor, the knowledge processor and a first transceiver being all installed in the monitored device, the first transceiver being adapted to enable data communication between the monitored device and the server and the portable electronic apparatus, the portable electronic apparatus comprising a processor, a memory, a second transceiver, an input including a camera, an output including a display, and a knowledge application configured to:

receive a device failure alarm indicating an emergency that the monitored device is about to fail or has failed;
 identify the monitored device that is about to fail or has failed and thus needs emergency repair attending by:
  positioning the camera of the portable electronic apparatus such that the monitored device that is about to fail or has failed is in the camera's field of view,
  taking via the camera of the portable electronic apparatus and sending in real-time via the second transceiver of the portable electronic apparatus a plurality of images of the monitored device that is about to fail or has failed to an image recognition engine located on the server, and
  receiving from the remote server via the second transceiver an indication of what the image recognition engine determined the monitored device that is about to fail or has failed is, based on a shape of the monitored device that is about to fail or has failed, identified from the plurality of images of the monitored device that is about to fail or has failed;
 offer a plurality of options, for selection by a user of the portable electronic apparatus, about how to proceed for the purpose of attending the identified monitored device that is about to fail or has failed; provide step-by-step guiding instructions as to how to attend the monitored device that is about to fail or has failed, said guiding instructions being specific to the identified monitored device that is about to fail or has failed and the option selected;
 mimic the behavior of a component of the monitored device that is about to fail or has failed, based on component's physical properties, when the user interacts with a corresponding 3D rendering of the component of the monitored device that is about to fail or has failed; and,
 if, after the user follows the guiding instructions, the purpose of attending the monitored device that is about to fail or has failed is not achieved, send an alert to management and connect with monitored device manufacturer's technical assistant via the second transceiver for live assisted repair of the monitored device that is about to fail or has failed.

\* \* \* \* \*